US012126889B2

(12) United States Patent
Shimada et al.

(10) Patent No.: US 12,126,889 B2
(45) Date of Patent: Oct. 22, 2024

(54) PHOTOGRAPHY SYSTEM AND TOILET APPARATUS

(71) Applicant: TOTO LTD., Kitakyushu (JP)

(72) Inventors: Mitsuhiro Shimada, Kitakyushu (JP); Hinako Kurashima, Kitakyushu (JP); Daisuke Suzawa, Kitakyushu (JP); Katsumi Yamanaka, Kitakyushu (JP); Tetsuya Fukunaga, Kitakyushu (JP)

(73) Assignee: TOTO LTD., Kitakyushu (JP)

( * ) Notice: Subject to any disclaimer, the term of this patent is extended or adjusted under 35 U.S.C. 154(b) by 118 days.

(21) Appl. No.: 18/160,543

(22) Filed: Jan. 27, 2023

(65) Prior Publication Data

US 2023/0247278 A1 Aug. 3, 2023

(30) Foreign Application Priority Data

Jan. 28, 2022 (JP) ................................ 2022-012436
Sep. 28, 2022 (JP) ................................ 2022-155148

(51) Int. Cl.
*H04N 23/61* (2023.01)
*A47K 13/24* (2006.01)
*H04N 23/62* (2023.01)

(52) U.S. Cl.
CPC ............. *H04N 23/61* (2023.01); *A47K 13/24* (2013.01); *H04N 23/62* (2023.01)

(58) Field of Classification Search
CPC ........ H04N 23/66; H04N 23/61; H04N 23/62; A47K 13/24
USPC .................................................... 348/207.99
See application file for complete search history.

(56) References Cited

U.S. PATENT DOCUMENTS

| 9,428,898 | B1 * | 8/2016 | Clements | ................... | E03D 9/08 |
| 9,477,317 | B1 * | 10/2016 | Clements | ................ | G06F 3/017 |
| 10,123,784 | B2 * | 11/2018 | Hall | .......................... | E03D 9/00 |
| 10,376,246 | B2 * | 8/2019 | Kashyap | ................. | H04N 23/11 |
| 11,604,177 | B1 * | 3/2023 | Park | ........................ | G01N 31/22 |
| 11,920,335 | B2 * | 3/2024 | Furuya | ................... | G06T 7/0002 |
| 2010/0134300 | A1 * | 6/2010 | Fukai | .................. | G08B 21/0492 340/573.1 |
| 2014/0147924 | A1 * | 5/2014 | Wheeldon | ............... | G01N 21/75 436/63 |

(Continued)

FOREIGN PATENT DOCUMENTS

JP 2018126331 A 8/2018
JP 2019198385 A 11/2019

(Continued)

OTHER PUBLICATIONS

Office Action issued on Aug. 8, 2023, in corresponding Japanese Application No. 2022-155148, 6 pages.

(Continued)

*Primary Examiner* — Pritham D Prabhakher
(74) *Attorney, Agent, or Firm* — Maier & Maier, PLLC (57) ABSTRACT

A photography system includes: an authentication unit executing personal authentication of a user using a toilet bowl; and a control unit controlling an image sensor 44 to automatically photograph an inside of a bowl of the toilet bowl. The control unit 312 conducts the automatic photographing of the inside of the bowl if the personal authentication is successful and does not conduct the automatic photographing of the inside of the bowl if the personal authentication fails.

6 Claims, 7 Drawing Sheets

(56) References Cited

U.S. PATENT DOCUMENTS

| | | | | |
|---|---|---|---|---|
| 2014/0323836 A1* | 10/2014 | Kusukame | ............... | A61B 5/00 |
| | | | | 600/300 |
| 2016/0278705 A1* | 9/2016 | Han | ............... | A61B 5/282 |
| 2017/0135677 A1* | 5/2017 | Hall | ............... | A61B 10/007 |
| 2019/0008457 A1 | 1/2019 | Hall et al. | | |
| 2019/0272727 A1* | 9/2019 | Yang | ............... | G08B 21/0492 |
| 2019/0293636 A1* | 9/2019 | Tsuruoka | ............... | G01N 33/50 |
| 2021/0401244 A1* | 12/2021 | Kawai | ............... | A47K 13/24 |
| 2022/0044801 A1* | 2/2022 | Murthy | ............... | G06K 7/1417 |
| 2022/0333364 A1* | 10/2022 | Furuya | ............... | G16H 50/20 |
| 2023/0047546 A1* | 2/2023 | Alexander | ............... | A61M 5/16881 |
| 2023/0225714 A1* | 7/2023 | Sato | ............... | G16H 30/40 |
| | | | | 73/865.8 |

FOREIGN PATENT DOCUMENTS

| | | |
|---|---|---|
| JP | 2021-55523 A | 4/2021 |
| TW | 201940784 A | 10/2019 |
| TW | 202127029 A | 7/2021 |

OTHER PUBLICATIONS

Office Action issued on Apr. 18, 2024, in corresponding Taiwanese Application No. 11320387040, 16 pages.

\* cited by examiner

|   | USER NAME (81) | IDENTIFICATION INFORMATION (82) |
|---|---|---|
| 1 | TARO TOKKYO | 0001 |
| 2 | HANAKO TOKKYO | 0004 |
| 3 | JIROU TOKKYO | 0008 |
| 4 | SHIROU TOKKYO | 0012 |
| 5 | SABUROU TOKKYO | 0013 |
| ⋮ | ⋮ | ⋮ |

FIG. 7

PHOTOGRAPHY SYSTEM AND TOILET APPARATUS

BACKGROUND

Field

The present invention relates to a photography system and a toilet apparatus.

Description of the Related Art

Japanese Patent Application Publication No. 2021-55523 discloses a toilet seat device including an image sensor that automatically photographs an inside of a bowl of a toilet bowl. This toilet seat device stops the image sensor from photographing the inside of the bowl when it determines that a toilet seat is in an open state.

SUMMARY

When a toilet bowl is used by multiple users, there may be cases where some of the users do not wish to have the inside of the bowl photographed. In such cases, when automatically photographing the inside of the bowl in the toilet bowl, even users who do not wish to be photographed may accidentally be photographed, causing discomfort to the users. Furthermore, even in a case where the image sensor stops photographing the inside of the bowl if the toilet seat lid is determined to be in an open state as in the toilet seat device described in Japanese Patent Application Publication No. 2021-55523, the inside of the bowl may be automatically photographed when the user sits on the toilet seat because the toilet seat is brought into a closed state, which may result in discomfort to the user.

The present invention has been made in view of these problems, and an object of the present invention is to prevent discomfort to users who do not wish to have the inside of a bowl automatically photographed.

To solve the above problems, a photography system according to a first aspect of the present invention includes: an authentication unit for executing personal authentication of a user using a toilet bowl; and a control unit for controlling an image sensor to automatically photograph an inside of a bowl of the toilet bowl, wherein the control unit conducts the automatic photographing of the inside of the bowl if the personal authentication is successful and does not conduct the automatic photographing of the inside of the bowl if the personal authentication fails.

With this configuration, users who do not wish to be photographed can avoid being automatically photographed by making their personal authentication fail when using the toilet bowl, which can prevent discomfort to the users who do not wish to be photographed. Among users who are using this toilet bowl for the first time, it is assumed that many of them do not wish to be photographed or do not know that they will be automatically photographed. The user who is using the toilet bowl for the first time can avoid being automatically photographed by making his/her personal authentication fail because his/her authentication information has not yet been set. This can prevent discomfort to the user using the toilet bowl for the first time.

The photography system according to a second aspect of the present invention further includes a storage unit for storing setting information indicative of permission or refusal of the photographing for one or more users, wherein the control unit conducts the automatic photographing of the inside of the bowl based on the setting information about the personally authenticated user if the personal authentication is successful.

With this configuration, users who do not wish to be photographed can avoid being automatically photographed by causing the setting information not to be stored in the storage unit or by storing, in the storage unit, setting information indicative of refusal of photographing. This can further prevent discomfort to the users who do not wish to be photographed.

In the photography system according to a third aspect of the present invention, the control unit determines whether or not the personally authenticated user matches a user described in the list if the personal authentication is successful. Then, the control unit conducts the automatic photographing of the inside of the bowl if the personally authenticated user is determined to match the user described in the list and does not conduct the automatic photographing of the inside of the bowl if the personally authenticated user is determined not to match the user described in the list.

With this configuration, a user who does not wish to be photographed can avoid being automatically photographed by causing the description of the user not to be inserted in the list, thereby further preventing discomfort to the user who does not wish to be photographed.

The photography system according to a fourth aspect of the present invention further includes a photography instruction unit for receiving a photography instruction provided by the user, wherein the control unit conducts the automatic photographing of the inside of the bowl when the photography instruction unit receives the photography instruction from the user, regardless of the setting information.

With this configuration, even when the user whose setting information is not stored in the storage unit uses the toilet bowl, the inside of the bowl can be automatically photographed by providing the photography instruction, thus improving the usability of the photography system.

The photography system according to a fifth aspect of the present invention further includes a stop instruction unit for receiving a stop instruction provided by the user, wherein the control unit does not conduct the automatic photographing of the inside of the bowl or stops photographing when the stop instruction unit receives the stop instruction, even if the personal authentication is successful.

With this configuration, a user who does not temporarily wish to be photographed due to illness or other reasons can avoid the inside of the bowl from being automatically photographed or can stop photographing by providing the stop instruction, thus improving the usability of the photography system.

A toilet apparatus according to a sixth aspect of the present invention includes: a toilet seat disposed above a toilet bowl; an image sensor for photographing an inside of a bowl of the toilet bowl; and a control unit for controlling an image sensor to automatically photograph the inside of the bowl of the toilet bowl, wherein the control unit acquires an authentication result of personal authentication of a user using the toilet bowl, and then the control unit conducts the automatic photographing of the inside of the bowl if the acquired authentication result indicates success and does not conduct the automatic photographing of the inside of the bowl if the acquired authentication result indicates failure.

With this configuration, users who do not wish to be photographed can avoid being automatically photographed by making their personal authentication fail when using the toilet bowl, which can prevent discomfort to the users who do not wish to be photographed.

Accordingly, the present invention can prevent discomfort to users who do not wish to have the inside of the bowl automatically photographed.

DETAILED DESCRIPTION

Hereinafter, embodiments of the present invention will be described with reference to the accompanying drawings. To make the description easier to understand, identical components in each drawing are denoted by the same sign as much as possible, and a duplicate description thereof is omitted below.

First Embodiment

Figure 1:
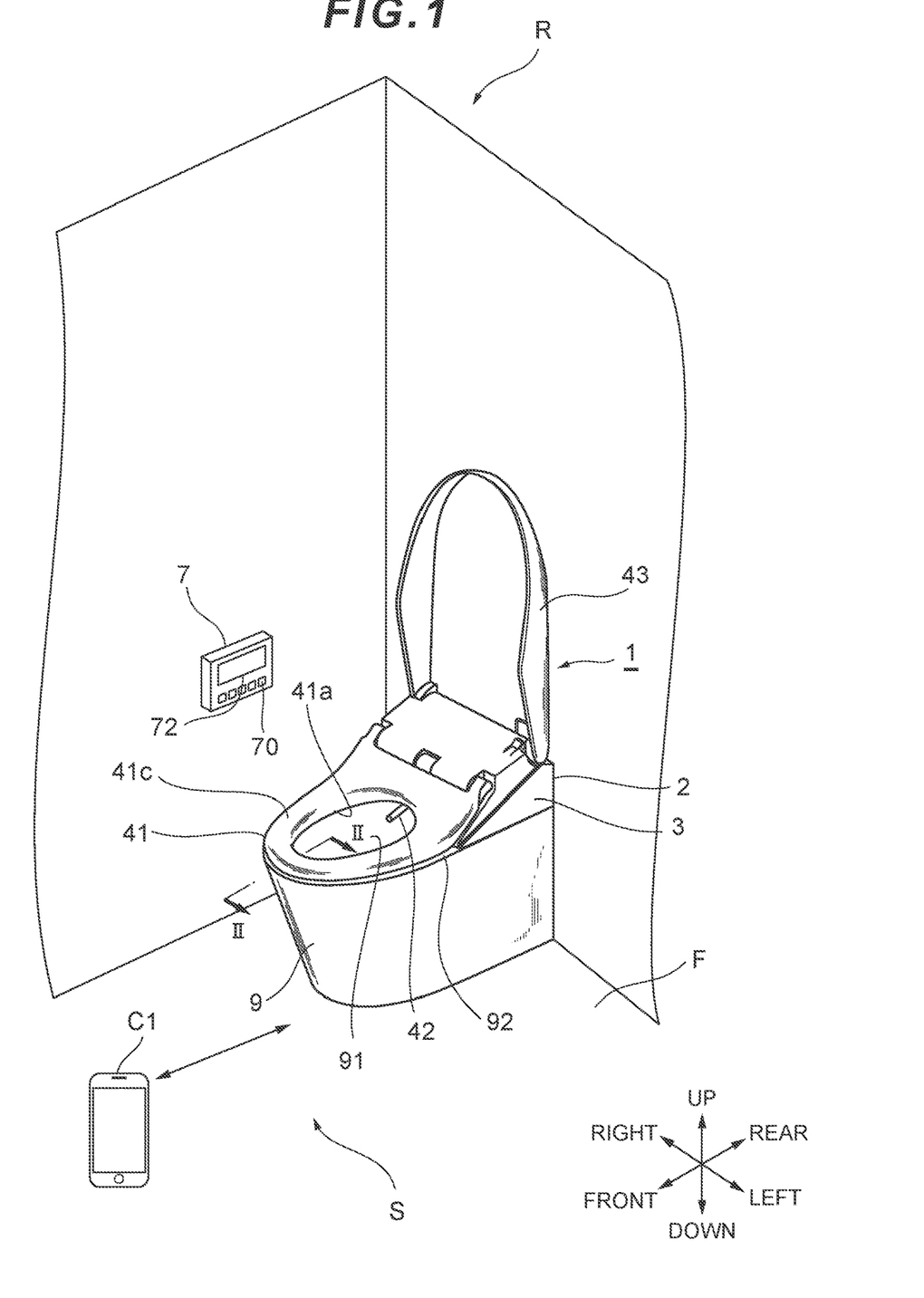
FIG. 1 is a perspective view illustrating a toilet room where a toilet apparatus is installed.
Figure 2:
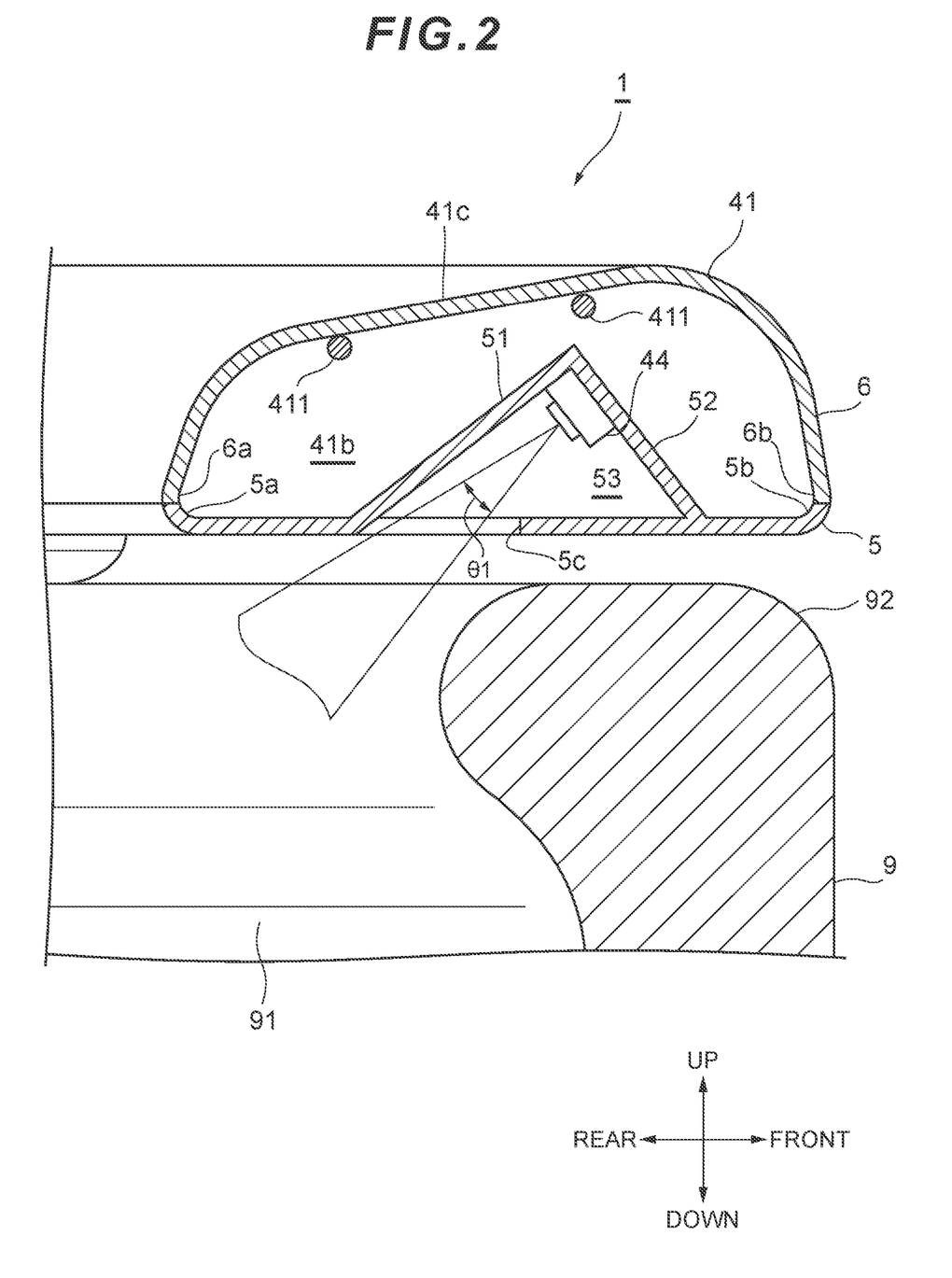
FIG. 2 is a cross-sectional view taken along the line II-II of FIG. 1.
Figure 3:
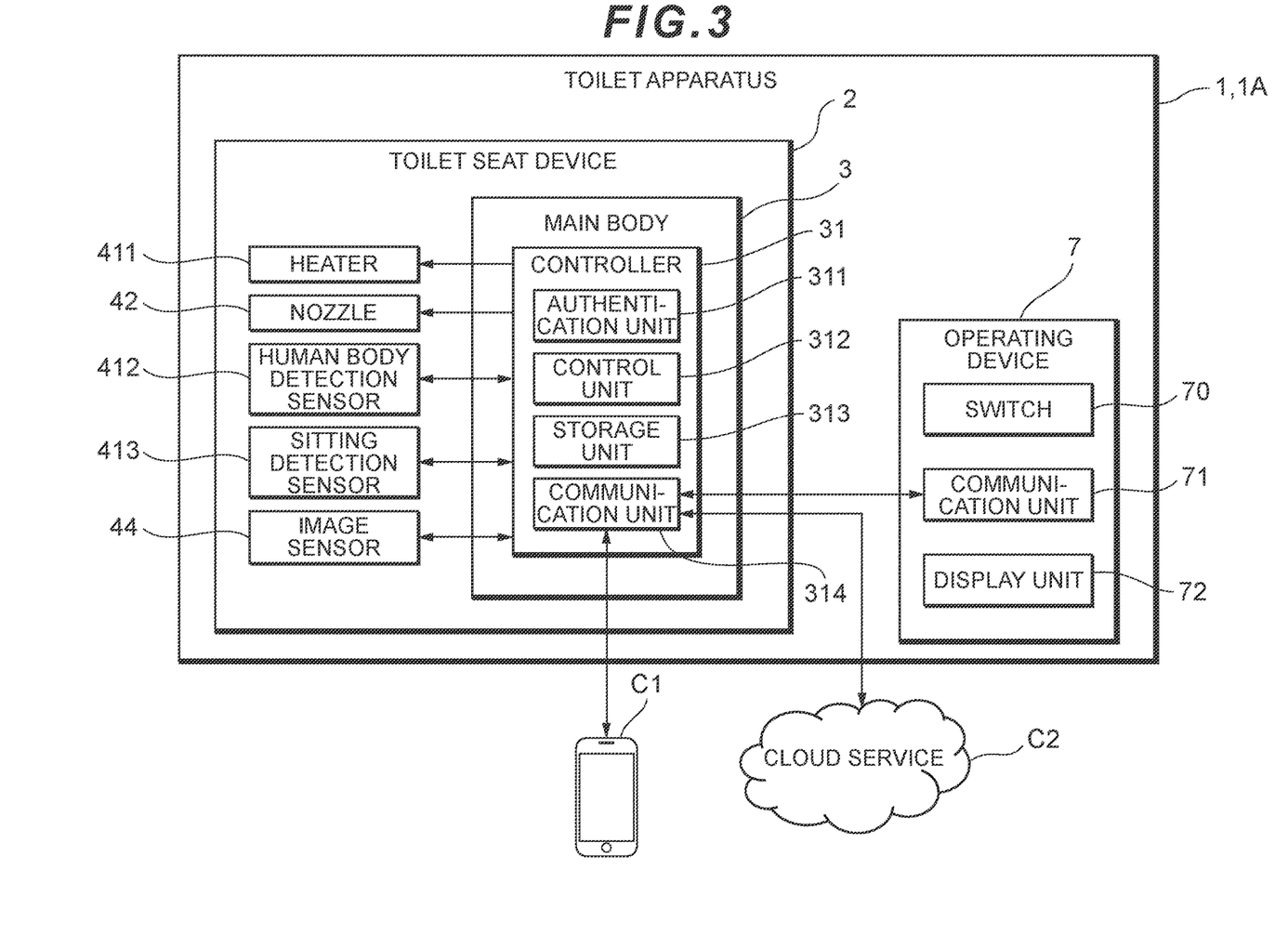
FIG. 3 is a block diagram of the toilet apparatus.
Figure 4:
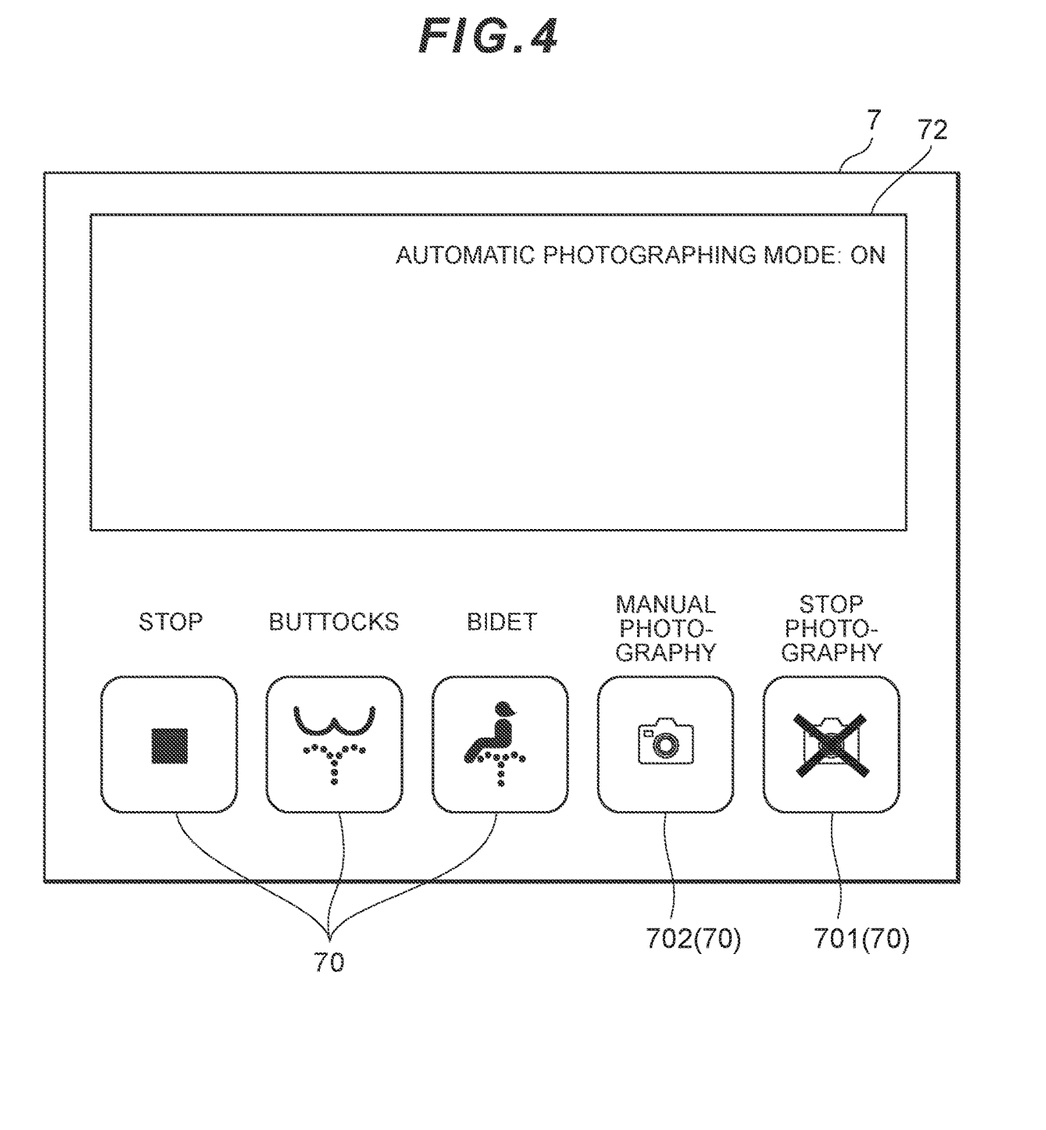
FIG. 4 is a front view illustrating an example of an operating device illustrated in FIG. 1.
Figure 5:
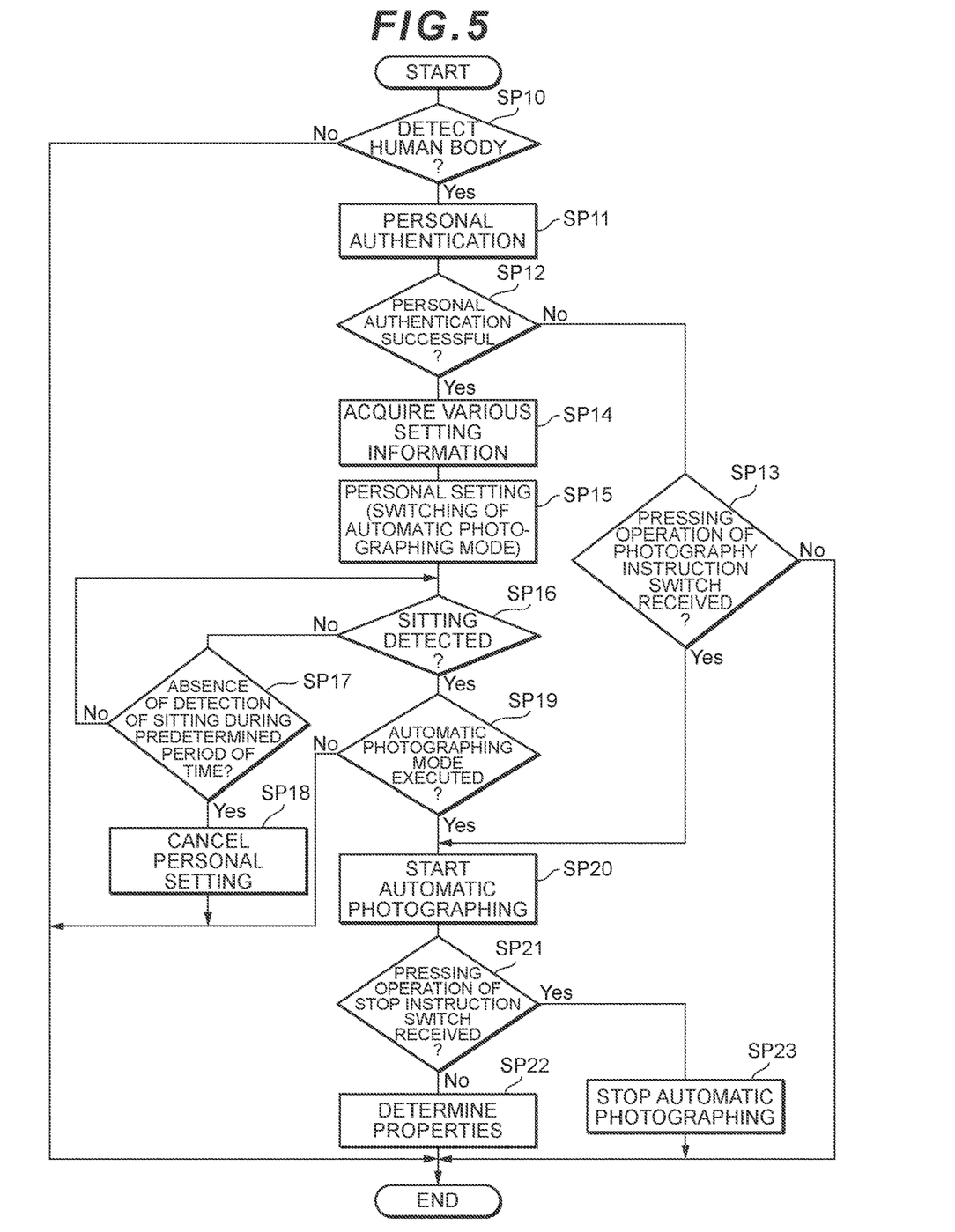
FIG. 5 is a flowchart illustrating an example of a processing flow performed by the toilet apparatus.

First of all, a photography system S and a toilet apparatus 1 according to a first embodiment of the present invention will be described with reference to FIGS. 1 to 5. FIG. 1 is a perspective view illustrating a toilet room R where the toilet apparatus 1 is installed; FIG. 2 is a cross-sectional view taken along the line II-II of FIG. 1; FIG. 3 is a block diagram of the toilet apparatus 1; FIG. 4 is a front view illustrating an example of an operating device illustrated in FIG. 1; and FIG. 5 is a flowchart illustrating an example of a processing flow performed by the toilet apparatus 1.

Entire Configuration

As illustrated in FIG. 1, the photography system S according to the first embodiment includes, for example, the toilet apparatus 1, an operating device 7, and a portable information terminal C1. The toilet apparatus 1 is applied to a toilet bowl 9 installed on a floor surface F of the toilet room R. The toilet bowl 9 is a stool bowl and has a bowl 91 for receiving user's feces and a rim 92 erected around the bowl 91. For example, when a user operates a flush operation unit (not shown) provided in the toilet room R, flush water is supplied to the bowl 91 to flush the bowl 91 and discharge feces from the bowl 91. The flush operation unit can take various forms, such as an operating lever provided in the toilet room R or a switch 70 provided in the operating device 7 to be described later.

The toilet apparatus 1 includes a toilet seat device 2 and the operating device 7. In the following description, as viewed from the user sitting on a toilet seat 41 described later, the front is referred to as "front," the rear as "rear," the left as "left," and the right as "right". In addition, the upward in the vertical direction is referred to as "up", and the downward in the vertical direction as "down".

The toilet seat device 2 is attached to an upper portion of the toilet bowl 9 and includes a main body 3, the toilet seat 41, a nozzle 42, and a toilet lid 43. The toilet seat device 2 may be detachably attached to the toilet bowl 9 or may be attached integrally onto the toilet bowl 9.

The toilet seat 41 is an element on which the user sits during defecation and supports the buttocks of the user at its seating surface 41c. The toilet seat 41 is annular in shape and has an opening 41a formed at its center. The bowl 91 is opened through the opening 41a when the toilet seat 41 is placed on the rim 92. The toilet seat 41 is pivotally supported at its rear end, and thereby the toilet seat 41 is rotatable between a posture where it is placed on the rim 92 and a posture where it is located away from the rim 92 to make the bowl 91 opened largely.

As illustrated in FIG. 2, the toilet seat 41 has a bottom plate 5 and a top plate 6. Both the bottom plate 5 and the top plate 6 are formed of resin material. An inner peripheral edge 5a of the bottom plate 5 and an inner peripheral edge 6a of the top plate 6 are welded together, and an outer peripheral edge 5b of the bottom plate 5 and an outer peripheral edge 6b of the top plate 6 are welded together, whereby the bottom plate 5 and the top plate 6 are joined to constitute the toilet seat 41. Center portions of the bottom plate 5 and the top plate 6 are arranged to be spaced apart from each other, thereby forming a void 41b inside the toilet seat 41. In addition to this configuration, the toilet seat 41 can take various forms, such as a configuration in which ribs erected on an upper surface of the bottom plate 5 and ribs erected on a lower surface of the top plate 6 are joined together by welding.

When the toilet seat 41 is placed on the rim 92 of the toilet bowl 9, the bottom plate 5 is arranged such that its part faces the rim 92 in the up-down direction, while the other part thereof is located above the bowl 91 as illustrated in FIG. 2. The other part of the bottom plate 5 is provided with an opening 5c. An image sensor 44 is provided, for example, in the void 41b behind the toilet seat 41. The image sensor 44 serves as a photographing unit that photographs the inside of the bowl 91 via the opening 5c. The image sensor 44 can photograph an object that is present within the angle of view θ1 in the side view as illustrated in FIG. 2. The configuration of the surroundings of the image sensor 44 will be described later.

The top plate 6 is arranged such that the seating surface 41c, which is a curved surface, faces upward. A heater 411 is attached to the lower surface of the top plate 6. The heater 411 is an electric heating wire that generates Joule heat when supplied with electric power.

The nozzle 42 illustrated in FIG. 1 is used to wash a user's local area. The nozzle 42 is configured such that it can advance and retract from the main body 3 within the bowl 91 by an electric motor (not shown). By opening an electromagnetic valve (not shown) when the nozzle 42 is located in the bowl 91, the nozzle 42 discharges water toward the user's local area.

The toilet lid 43 is pivotally supported at its rear end and is configured to be rotatable between a posture where it covers the toilet seat 41 and a posture where it makes the toilet seat 41 opened.

The operating device 7 is to operate the toilet seat device 2 and is installed, for example, on a wall surface of the toilet room R. The operating device 7 has a plurality of switches 70 corresponding to a plurality of operations of the toilet seat device 2. As illustrated in FIG. 3, the operating device 7 further has a communication unit 71 and a display unit 72. The communication unit 71 transmits and receives signals wirelessly from and to a communication unit 314 of the toilet seat device 2 described later. The display unit 72 is a liquid crystal panel provided on an outer side surface of the operating device 7 and displays various information.

As in the operating device 7, the portable information terminal C1 may be used to remotely operate the toilet seat device 2 by performing wireless communication with the toilet seat device 2. The portable information terminal C1 is, for example, a smartphone or tablet device owned by the user. However, the portable information terminal C1 is not limited thereto, but may be any terminal that can be carried by the user.

As illustrated in FIG. 3, a controller 31 is arranged in the main body 3 of the toilet seat device 2. The controller 31 is entirely or partially constituted of either an analog circuit or a digital processor or memory. The controller 31 includes an authentication unit 311, a control unit 312, a storage unit 313, and the communication unit 314 as functional blocks. The authentication unit 311 executes personal authentication of the user using the toilet bowl 9. The authentication unit 311 may be provided in the operating device 7 or portable information terminal C1. The control unit 312 conducts various controls based on a signal or the like received by the controller 31 from the outside. The storage unit 313 stores therein various setting information, parameters, authentication information (identification information and passwords) for the personal authentication, and the like. The communication unit 314 transmits and receives signals to and from the outside of the toilet seat device 2, such as the user's portable information terminal C1 or cloud service C2, for example.

The software module incorporated in the controller 31 is not necessarily divided into the functional blocks illustrated in FIG. 3. That is, the actual analog circuit and module may be configured to function as the plurality of functional blocks illustrated in FIG. 3, or they may be further subdivided. The configuration of the controller 31 can be changed as appropriate by a person skilled in the art as long as the controller 31 can be configured to execute the processing described later.

The controller 31 is connected to the heater 411, the nozzle 42, a human body detection sensor 412 as a human body detection unit, a sitting detection sensor 413 as a sitting detection unit, and the image sensor 44 so that the controller 31 can transmit control signals thereto. The human body detection sensor 412 detects the user (human body) entering the toilet room R. The sitting detection sensor 413 detects the sitting of the user on the toilet seat 41. The controller 31 can receive detection signals from these human body detection sensor 412 and sitting detection sensor 413 or can receive an image signal from the image sensor 44.

Operation Example

When the control unit 312 of the controller 31 determines that the user sits on the toilet seat 41, based on a signal received from the sitting detection sensor 413, the control unit 312 transmits a control signal to the heater 411 (that is, the heater 411 is supplied with electric power). Thus, the temperature of the top plate 6 increases as the top plate 6 receives Joule heat generated from the heater 411, whereby the heating of the toilet seat 41 is performed.

When the user presses down the switch 70 of the operating device 7 corresponding to the start of local-area washing, the communication unit 71 of the operating device 7 generates a signal corresponding to the switch 70 and transmits the signal wirelessly to the toilet seat device 2. In the toilet seat device 2, this signal is received at the communication unit 314 of the controller 31, so that the controller 31 transmits a control signal to the nozzle 42, for example. The nozzle 42 that has received the control signal advances from the main body 3 into the bowl 91 and discharges water supplied from an opened electromagnetic valve toward the local area of the user.

The control unit 312 of the controller 31 controls the image sensor 44 after or during defecation of the user to thereby execute an automatic photographing mode in which the inside of the bowl 91 is automatically photographed (hereinafter referred to as "automatic photographing" as appropriate) without any user's operation. In the automatic photographing, the inside of the bowl 91 is photographed a plurality of number of times during a predetermined time. The image sensor 44 transmits an image signal corresponding to a photographed image of the inside of the bowl 91 to the controller 31. The controller 31 that has received the image signal stores an image based on the image signal in the storage unit 313. Additionally, the control unit 312 determines at least one of the presence or absence, color, shape, and amount of user's feces from the image based on the image signal according to a prescribed program. The communication unit 314 of the controller 31 generates a signal corresponding to this determination result and transmits it to the external cloud service C2. By accessing this cloud service C2 and acquiring the above determination result, medical professionals, etc., are able to grasp the health condition of the user and provide advices based on it.

Prevention of Discomfort

The toilet apparatus 1 is devised to prevent discomfort to users who do not wish to have the inside of the bowl 91 automatically photographed. Hereinafter, this point will be described.

The control unit 312 of the controller 31 conducts the automatic photographing of the inside of the bowl 91 based on whether the personal authentication of the authentication unit 311 is successful or not. Specifically, the control unit 312 conducts the automatic photographing of the inside of the bowl 91 if the personal authentication is successful and does not conduct the automatic photographing of the inside of the bowl 91 if the personal authentication fails.

The storage unit 313 stores setting information indicative of permission or refusal of the photographing for one or more users. In the first embodiment, the storage unit 313 stores the setting information indicative of permission or refusal of the photographing in association with each identification information about the user. The control unit 312 conducts the automatic photographing of the inside of the bowl 91 based on the setting information about the personally authenticated user if the personal authentication is successful. Specifically, the control unit 312 conducts the automatic photographing of the inside of the bowl 91 if the setting information about the personally authenticated user indicates the permission of the photographing, whereas the control unit 312 does not conduct the automatic photographing of the inside of the bowl 91 if the setting information about the personally authenticated user indicates refusal of the photographing.

As illustrated in FIG. 4, the plurality of switches 70 of the operating device 7 includes a stop instruction switch 701 as a stop instruction unit that receives a stop instruction from the user and a photography instruction switch 702 as a photography instruction unit that receives a photography instruction from the user. The control unit 312 does not conduct the automatic photographing of the inside of the bowl 91 or stops photographing when the stop instruction switch 701 receives the stop instruction, i.e., when the stop instruction switch 701 is pressed down, even if the personal authentication is successful. When the photographing is stopped after the automatic photographing is started, the control unit 312 deletes an image photographed before the stopping, from the storage unit 313 of the controller 31. The control unit 312 conducts the automatic photographing of the inside of the bowl 91 when the photography instruction switch 702 receives the photography instruction from the user, i.e., when the photography instruction switch 702 is pressed down, regardless of the setting information (even if the setting information indicates the refusal of the photographing).

Hereinafter, a description will be given of an example of a sequential processing flow for preventing discomfort to users with reference to FIG. 5. The sequential processing illustrated in FIG. 5 is repeatedly conducted, for example, every few seconds.

(Step SP10)

The control unit 312 of the controller 31 determines whether or not the human body detection sensor 412 detects a human body, based on a detection signal from the human body detection sensor 412. If the determination is affirmative, the processing proceeds to a process in step SP11. On the other hand, if the determination is negative, the sequential processing illustrated in FIG. 5 is ended.

(Step SP11)

The authentication unit 311 executes personal authentication of the user by communicating with the portable information terminal C1 of the user entering the toilet room R. Specifically, the authentication unit 311 receives identification information and a password associated with the user from the portable information terminal C1 and determines whether or not the identification information and the password match authentication information stored in the storage unit 313. If they are determined to match the authentication information, the personal authentication is determined to be successful. On the other hand, if they are determined not to match the authentication information, the personal authentication is determined to fail. The authentication unit 311 also determines that the personal authentication fails if it cannot communicate with the portable information terminal C1 of the user entering the toilet room. R. Then, the processing proceeds to a process in step SP12.

(Step SP12)

The control unit 312 determines whether the personal authentication executed by the authentication unit 311 is successful or not. If the determination is affirmative, the processing proceeds to a process in step SP14. On the other hand, if the determination is negative, the processing proceeds to a process in step SP13.

(Step SP13)

The control unit 312 determines whether or not the photography instruction switch 702 receives a pressing operation. If the determination is affirmative, the processing proceeds to a process in step SP20. On the other hand, if the determination is negative, the sequential processing illustrated in FIG. 5 is ended.

(Step SP14)

If the determination is affirmative in step SP12, various setting information associated with the personally authenticated user is acquired from the storage unit 313. Various setting information also include setting information indicative of permission or refusal of the photographing. Then, the processing proceeds to a process in step SP15.

(Step SP15)

The control unit 312 executes personal setting of the toilet apparatus 1 based on the various setting information acquired. At this time, the control unit 312 switches to execution (ON) or stopping (OFF) of the automatic photographing mode based on the setting information indicative of the permission or refusal of the photographing. Specifically, the control unit 312 switches to the executing of the automatic photographing mode if the setting information indicates the permission of the photographing, whereas the control unit 312 switches to the stopping of the automatic photographing mode if the setting information indicates the refusal of the photographing. At this time, the control unit 312 controls the operating device 7 to switch between ON and OFF of the automatic photographing mode of the display unit 72 illustrated in FIG. 4. Then, the processing proceeds to a process in step SP16.

(Step SP16)

The control unit 312 determines whether or not the sitting detection sensor 413 detects sitting of the user, based on a detection signal from the sitting detection sensor 413. If the determination is affirmative, the processing proceeds to a process in step SP19. On the other hand, if the determination is negative, the processing proceeds to a process in step SP17.

(Step SP17)

The control unit 312 determines whether there is an absence of detection of the user's sitting by the sitting detection sensor 413 within a predetermined period of time after detecting the human body of the user. If the determination is affirmative, the processing proceeds to a process in step SP18. On the other hand, if the determination is negative, the processing proceeds to the process in step SP16.

(Step SP18)

The control unit 312 cancels the personal setting set in the toilet apparatus 1. Then, the sequential processing illustrated in FIG. 5 is ended.

(Step SP19)

If the determination is affirmative in step SP16, the control unit 312 determines whether or not the automatic photographing mode is executed. If the determination is affirmative, the processing proceeds to a process in step SP20. On the other hand, if the determination is negative, the sequential processing illustrated in FIG. 5 is ended.

(Step SP20)

The control unit 312 starts conducting the automatic photographing of the inside of the bowl 91. Then, the processing proceeds to a process in step SP21.

(Step SP21)

The control unit 312 determines whether or not the stop instruction switch 701 receives a pressing operation. If the determination is affirmative, the processing proceeds to a process in step SP23. On the other hand, if the determination is negative, the processing proceeds to a process in step SP22.

(Step SP22)

The control unit 312 determines the presence or absence of user's feces, or the properties of the user's feces, such as the color, shape, and amount thereof, from the image obtained by the automatic photography. The communication unit 314 generates a signal corresponding to this determination result and transmits it to the external cloud service C2 or portable information terminal C1. Then, the sequential processing illustrated in FIG. 5 is ended.

(Step SP23)

If the determination is affirmative in step SP21, the control unit 312 stops the automatic photographing and deletes the image automatically photographed before the stopping, from the storage unit 313 of the controller 31.

Action and Effects

With the above configuration, users who do not wish to be photographed can avoid being automatically photographed by making their personal authentication fail when using the toilet bowl 9, which can prevent discomfort to the users who do not wish to be photographed. Among users who are using the toilet bowl 9 for the first time, it is assumed that many of them do not wish to be photographed or do not know that they will be automatically photographed. The user who is using the toilet bowl 9 for the first time can avoid being automatically photographed by making his/her personal authentication fail because his/her authentication information has not yet been set in the toilet apparatus 1. This can prevent discomfort to the user using the toilet bowl 9 for the first time.

The control unit 312 conducts the automatic photographing of the inside of the bowl 91 based on the setting information about the personally authenticated user if the personal authentication is successful.

With this configuration, users who do not wish to be photographed can avoid being automatically photographed by causing the setting information not to be stored in the storage unit 313 or by storing, in the storage unit 313, setting information indicative of refusal of photographing. This can further prevent discomfort to the users who do not wish to be photographed.

Further, the control unit 312 conducts the automatic photographing of the inside of the bowl 91 when the photography instruction switch 702 receives the photography instruction from the user, regardless of the setting information about the user.

With this configuration, even when the user whose setting information is not stored in the storage unit 313 uses the toilet bowl 9, the inside of the bowl 91 can be automatically photographed by providing the photography instruction, thus improving the usability of the photography system S.

Furthermore, the control unit 312 does not conduct the automatic photographing of the inside of the bowl 91 or stops photographing when the stop instruction switch 701 receives the stop instruction, even if the personal authentication is successful.

With this configuration, a user who does not temporarily wish to be photographed due to illness or other reasons can avoid having the inside of the bowl 91 from being automatically photographed or can stop photographing by providing the stop instruction, thus improving the usability of the photography system S.

Second Embodiment

Figure 6:
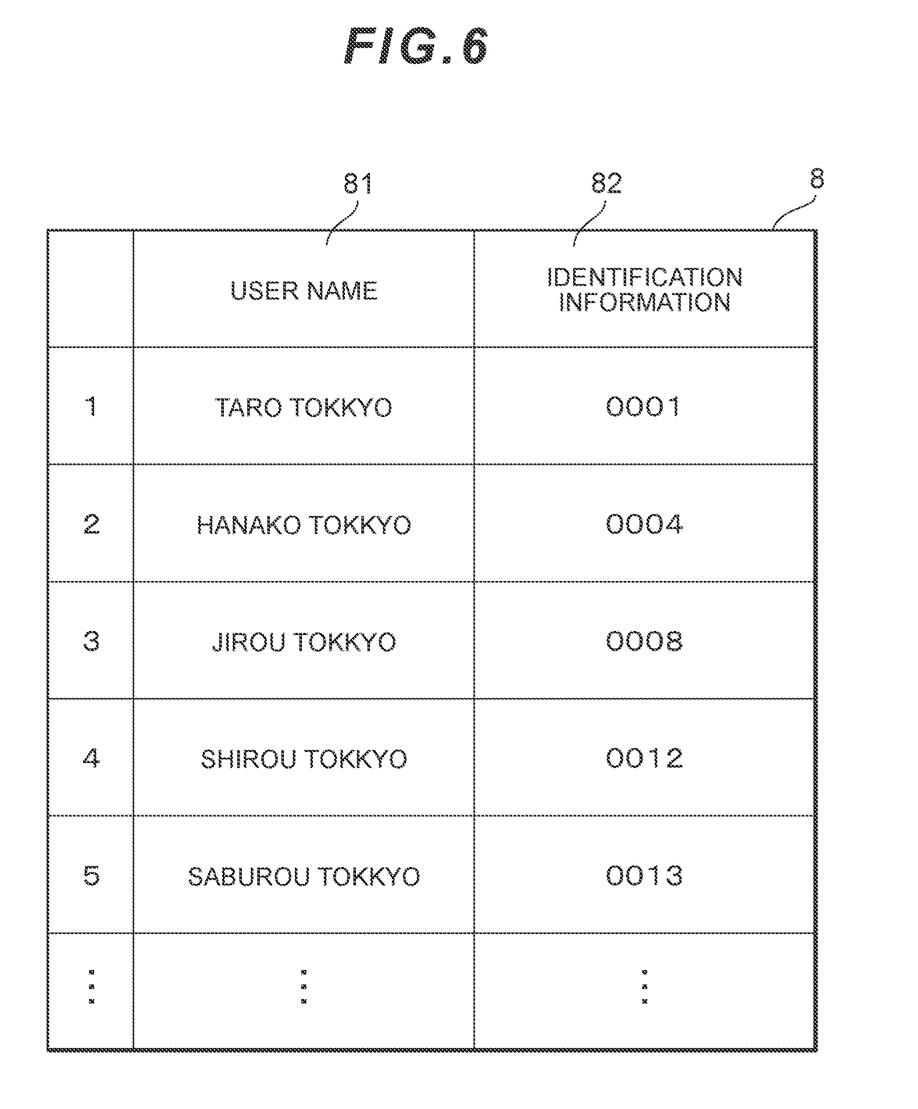
FIG. 6 is a diagram illustrating an example of a permission list stored as setting information in a storage unit illustrated in FIG. 3.
Figure 7:
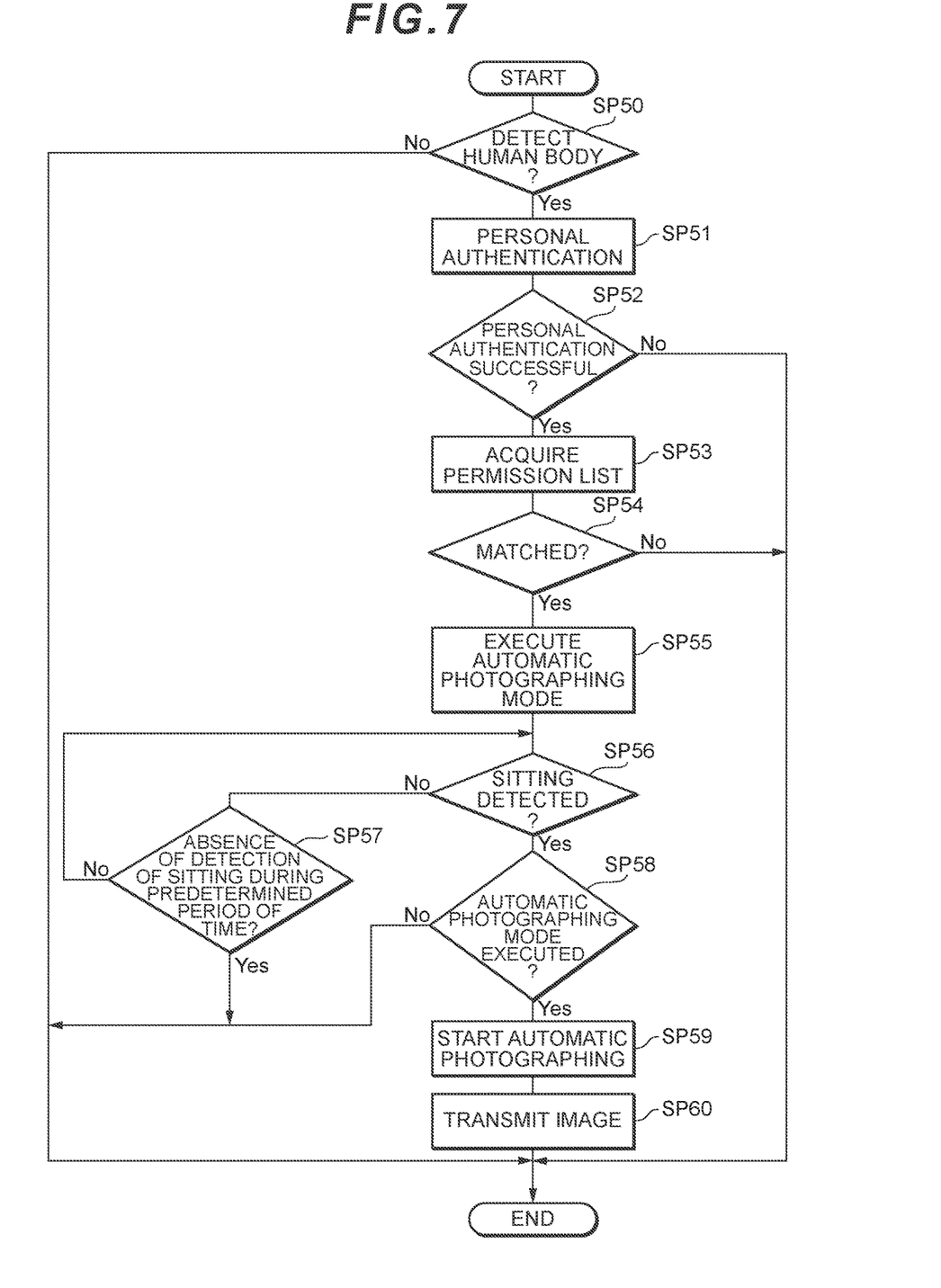
FIG. 7 is a flowchart illustrating a modification of a processing flow performed by the toilet apparatus.

Next, a toilet apparatus 1A according to a second embodiment will be described with reference to FIGS. 3, 6, and 7. FIG. 6 is a diagram illustrating an example of a permission list 8 stored as the setting information in the storage unit 313, and FIG. 7 is a flowchart illustrating a modification of a processing flow performed by the toilet apparatus 1A. The toilet apparatus 1A of the second embodiment differs from the toilet apparatus of the first embodiment in the processing flow in the toilet apparatus 1A. Of the toilet apparatus 1A according to the second embodiment, the same component as in the first embodiment is denoted by the same reference character, and its description is omitted as appropriate.

As illustrated in FIG. 6, user names 81 of users who permit photographing and identification information 82 about the users are described in the permission list 8 in association with each other.

The control unit 312 determines whether or not the personally authenticated user matches the identification information about the user described in the permission list 8 if the personal authentication is successful. The control unit 312 then conducts the automatic photographing of the inside of the bowl 91 if the personally authenticated user is determined to match the user described in the list and does not conduct the automatic photographing of the inside of the bowl 91 if the personally authenticated user is determined not to match the user described in the permission list 8.

Hereinafter, a description will be given of an example of a sequential processing flow for preventing discomfort to users with reference to FIG. 7. The sequential processing illustrated in FIG. 7 is repeatedly conducted, for example, every few seconds.

(Step SP50)

The control unit 312 of the controller 31 determines whether or not the human body detection sensor 412 detects a human body, based on a detection signal from the human body detection sensor 412. If the determination is affirmative, the processing proceeds to a process in step SP51. On the other hand, if the determination is negative, the sequential processing illustrated in FIG. 7 is ended.

(Step SP51)

The authentication unit 311 executes personal authentication of the user by reading an identification card of the user entering the toilet room R. Specifically, the authentication unit 311 acquires identification information from the identification card of the user and determines whether or not the identification information matches the authentication information stored in the storage unit 313. If the identification information is determined to match the authentication information, the authentication unit 311 determines that the personal authentication is successful. On the other hand, if the identification information is determined not to match the authentication information, the authentication unit 311 determines that the personal authentication fails. The authentication unit 311 also determines that the personal authentication fails if it cannot read the identification card of the user entering the toilet room R or if there is no corresponding identification card. Then, the processing proceeds to a process in step SP52.

(Step SP52)

The control unit 312 determines whether the personal authentication executed by the authentication unit 311 is successful or not. If the determination is affirmative, the processing proceeds to a process in step SP53. On the other hand, if the determination is negative, the sequential processing illustrated in FIG. 7 is ended.

(Step SP53)

The control unit 312 acquires the permission list 8 from the storage unit 313. Then, the processing proceeds to a process in step SP54.

(Step SP54)

The control unit 312 determines whether or not the identification information about the personally authenticated user matches the identification information about a user described in the permission list 8. If the determination is affirmative, the processing proceeds to a process in step SP55. On the other hand, if the determination is negative, the sequential processing illustrated in FIG. 7 is ended.

(Step SP55)

The control unit 312 executes the automatic photographing mode. Then, the processing proceeds to a process in step SP56.

(Step SP56)

The control unit 312 determines whether or not the sitting detection sensor 413 detects sitting of the user, based on the detection signal from the sitting detection sensor 413. If the determination is affirmative, the processing proceeds to a process in step SP58. On the other hand, if the determination is negative, the processing proceeds to a process in step SP57.

(Step SP57)

The control unit 312 determines whether or not there is an absence of detection of the user's sitting by the sitting detection sensor 413 within a predetermined period of time after detecting the human body of the user. If the determination is affirmative, the sequential processing illustrated in FIG. 7 is ended. On the other hand, if the determination is negative, the processing returns to a process in step SP56.

(Step SP58)

If the determination is affirmative in step SP56, the control unit 312 determines whether or not the automatic photographing mode is executed. If the determination is affirmative, the processing proceeds to a process in step SP59. On the other hand, if the determination is negative, the sequential processing illustrated in FIG. 7 is ended.

(Step SP59)

The control unit 312 starts conducting the automatic photographing of the inside of the bowl 91. Then, the processing proceeds to a process in step SP60.

(Step SP60)

The communication unit 314 transmits the image obtained by the automatic photographing to the portable information terminal C1 or the cloud service C2. The portable information terminal C1 or the cloud service C2 determines the presence or absence of user's feces, or the properties of the user's feces, such as the color, shape, and amount of the feces, from the received image, and informs the user of the determination results.

Action and Effects

In the second embodiment, the control unit 312 determines whether or not the personally authenticated user matches the identification information about the user described in the permission list 8 if the personal authentication is successful. The control unit 312 then conducts the automatic photographing of the inside of the bowl 91 if the personally authenticated user is determined to match the user described in the permission list 8 and does not conduct the automatic photographing of the inside of the bowl 91 if the personally authenticated user is determined not to match the user described in the permission list 8.

With this configuration, a user who does not wish to be photographed can avoid being automatically photographed by causing the description of the user not to be inserted in the permission list 8, thereby further preventing discomfort to the user who does not wish to be photographed.

Modifications

The present invention is not limited to the embodiments described above. In other words, the above embodiments with appropriate design changes made by those skilled in the art are also included in the scope of the present invention as long as they have the features of the present invention.

The first embodiment has described, for example, a case where the operating device 7 includes the stop instruction switch 701 and the photography instruction switch 702, but these switches may be omitted entirely or partially. The stop instruction switch 701 and the photography instruction switch 702 may be applied to the toilet apparatus 1A of the second embodiment. Furthermore, a case where the stop instruction unit is the stop instruction switch 701 has been described, but the stop instruction unit may be the display unit 72, the portable information terminal C1, or the cloud service C2. Similarly, a case where the photography instruction unit is the photography instruction switch 702 has been described, but the photography instruction unit may be the display unit 72, the portable information terminal C1, or the cloud service C2.

The first embodiment has described a case where the authentication unit 311 conducts the personal authentication by communicating with the portable information terminal C1, whereas the second embodiment has described a case where the authentication unit 311 conducts the personal authentication by reading the identification card. However, in addition to these, by including switches provided for the respective users in the switches 70 of the operating device 7, the authentication unit 311 may conduct the personal authentication of the user through the pressing operation of these switches. The authentication unit 311 may conduct personal authentication based on a user's operating method or operation contents of the operating device 7. The authentication unit 311 may conduct personal authentication (biometric authentication) based on biometric information such as the user's fingerprints, veins, weight, iris of the eyes, vocal cords, face, anus, etc.

For example, when authentication is conducted using fingerprints, a fingerprint sensor (not shown) that reads user's fingerprint data is communicatively connected to the controller 31, and the fingerprint data about one or more users is stored in the storage unit 313. When receiving the user's fingerprint data from the fingerprint sensor, the authentication unit 311 determines whether or not the fingerprint data matches each fingerprint data stored in the storage unit 313. If the fingerprint data is determined to match the stored fingerprint data, the authentication unit 311 determines that the personal authentication is successful. On the other hand, if the fingerprint data is determined not to match the stored fingerprint data, the authentication unit 311 determines that the personal authentication fails. From the viewpoint of enhancing the accuracy of the personal authentication based on the biometric information, the authentication unit 311 may conduct personal authentication based on two or more types of biometric information, such as the user's fingerprints and vocal cords or the user's face and anus. From the same point of view, the authentication unit 311 may conduct personal authentication based on the biometric information and a passcode. Specifically, when receiving user's fingerprint data from the fingerprint sensor, the authentication unit 311 determines whether or not the fingerprint data matches each fingerprint data stored in the storage unit 313. If the fingerprint data is determined to match the stored fingerprint data, the user is further requested to input his/her passcode. If the fingerprint data is determined not to match the stored fingerprint data, the authentication unit 311 determines that the personal authentication fails. Once the passcode is input by the user in response to the request for inputting, the authentication unit 311 determines whether or not the input passcode matches a passcode stored in the storage unit 313. If the input passcode is determined to match the stored passcode, the authentication unit 311 determines that the personal authentication is successful. On the other hand, if the input passcode is determined not to match the stored passcode, the authentication unit 311 determines that the personal authentication fails.

When the authentication unit 311 reads identification information on the identification card using radio waves to conduct personal authentication, or when the authentication unit 311 communicates with the portable information terminal C1 to conduct personal authentication, in order to prevent misidentification of the user who has passed through the toilet apparatus 1, the authentication unit 311 determines whether or not a distance between the user and the toilet apparatus 1 indicated by distance data output from a distance sensor (not shown) provided in the toilet apparatus 1 is less than or equal to a certain distance. If the authentication unit 311 determines that the distance is less than or equal to the certain distance, the authentication unit 311 starts conducting personal authentication. On the other hand, if the authentication unit 311 determines that the distance exceeds the certain distance, the authentication unit 311 does not start conducting the personal authentication.

Since the toilet structure varies depending on facilities, the above certain distance is preferably variable. In this case, the control unit 312 may receive a manager's input operation of distance information and may set (change) the above certain distance to a distance indicated by the received distance information. Alternatively, the control unit 312 may receive distance information from the cloud service C2 and may set (change) the above certain distance to a distance indicated by the received distance information. In a case where such a distance sensor is provided in this way, the human body detection sensor 412 may be omitted. Alternatively, in a case where the human body detection sensor 412 and the distance sensor are combined, the control unit 312 may inform the user that the personal authentication will be conducted, via a speaker (not shown) or the portable information terminal C1 when the human body detection sensor 412 detects a human body and before the distance sensor determines whether or not the above distance is less than or equal to the certain distance.

The first embodiment has described a case where the control unit 312 does not perform any processing when not conducting automatic photographing, but the control unit 312 may control a shielding member (not shown) provided on the toilet seat 41 to conceal a lens portion of the image sensor 44 when not conducting automatic photographing. On the other hand, when conducting automatic photographing, the control unit 312 may control the shielding member (not shown) provided on the toilet seat 41 to expose the lens portion of the image sensor 44. This can further prevent discomfort to users who do not wish to have the inside of the bowl 91 automatically photographed.

The first embodiment has described a case where the image sensor 44 is provided on the back of the toilet seat 41, but the image sensor 44 may be provided in any position of the toilet seat 41 other than its back, such as the side of the toilet seat 41, and may also be provided on the toilet bowl 9, the operating device 7, the toilet room R, and the like.

REFERENCE SIGNS LIST 1, 1A Toilet apparatus
8 Permission list (list)
9 Toilet bowl
41 Toilet seat
44 Image sensor
91 Bowl
311 Authentication unit
312 Control unit
313 Storage unit
413 Sitting detection sensor (sitting detection unit)
701 Stop instruction switch (stop instruction unit)
702 Photography instruction switch (photography instruction unit)
S Photography system

What is claimed is:

1. A photography system comprising:
an authentication unit executing personal authentication of a user using a toilet bowl; and
a control unit controlling an image sensor to automatically photograph an inside of a bowl of the toilet bowl,
wherein the control unit conducts the automatic photographing of the inside of the bowl if the personal authentication is successful and does not conduct the automatic photographing of the inside of the bowl if the personal authentication fails.

2. The photography system according to claim 1, further comprising:
a storage unit storing setting information indicative of permission or refusal of the photographing for one or more users,
wherein the control unit conducts the automatic photographing of the inside of the bowl based on the setting information about the personally authenticated user if the personal authentication is successful.

3. The photography system according to claim 2, wherein
the storage unit stores a list in which the one or more users permitting the photographing are described, as the setting information, and
the control unit determines whether or not the personally authenticated user matches a user described in the list if the personal authentication is successful, and then the control unit conducts the automatic photographing of the inside of the bowl if the personally authenticated user is determined to match the user described in the list and does not conduct the automatic photographing of the inside of the bowl if the personally authenticated user is determined not to match the user described in the list.

4. The photography system according to claim 2, further comprising:
a photography instruction unit receiving a photography instruction provided by the user,
wherein the control unit conducts the automatic photographing of the inside of the bowl when the photography instruction unit receives the photography instruction from the user, regardless of the setting information.

5. The photography system according to claim 1, further comprising:
a stop instruction unit receiving a stop instruction provided by the user,
wherein the control unit does not conduct the automatic photographing of the inside of the bowl or stops photographing when the stop instruction unit receives the stop instruction, even if the personal authentication is successful.

6. A toilet apparatus comprising:
a toilet seat disposed above a toilet bowl;
an image sensor photographing an inside of a bowl of the toilet bowl; and
a control unit controlling the image sensor to automatically photograph the inside of the bowl of the toilet bowl, wherein the control unit acquires an authentication result of personal authentication of a user using the toilet bowl, and then the control unit conducts the automatic photographing of the inside of the bowl if the acquired authentication result indicates success and does not conduct the automatic photographing of the inside of the bowl if the acquired authentication result indicates failure.

* * * * *